United States Patent [19]
Hammeken

[11] Patent Number: 5,490,926
[45] Date of Patent: Feb. 13, 1996

[54] SPIRAL-WOUND FILTRATION CARTRIDGE WITH LONGITUDINAL BYPASS FEATURE

[75] Inventor: Michael Hammeken, West Newbury, Mass.

[73] Assignee: W.R. Grace & Co.-Conn., New York, N.Y.

[21] Appl. No.: 332,013

[22] Filed: Oct. 31, 1994

[51] Int. Cl.$^6$ ............................................. B01D 27/06
[52] U.S. Cl. ...................... 210/321.74; 210/321.83; 210/497.1; 55/498; 55/500; 55/520; 96/4
[58] Field of Search ................... 96/4; 55/498.5, 55/520; 210/321.76, 321.74, 321.83, 321.85, 493.4, 433.1, 497.1

[56] References Cited

U.S. PATENT DOCUMENTS

| | | | |
|---|---|---|---|
| 3,389,797 | 6/1968 | Giardini | 210/138 |
| 3,754,658 | 8/1973 | Messing | 210/304 |
| 4,016,083 | 4/1977 | Sakaguchi et al. | 210/433 |
| 4,064,052 | 12/1977 | Zimmerly | 210/433 |
| 4,301,013 | 11/1981 | Setti et al. | 210/321.83 |
| 4,600,512 | 7/1986 | Aid | 210/321.83 |
| 4,839,037 | 6/1989 | Bertelsen et al. | 210/321.83 |
| 4,906,372 | 3/1990 | Hopkins | 210/321.74 |
| 5,024,771 | 6/1991 | Chiarito | 210/791 |
| 5,108,604 | 4/1992 | Robbins | 210/321.74 |
| 5,128,037 | 7/1992 | Pearl et al. | 210/321.74 |
| 5,192,437 | 3/1993 | Chang et al. | 210/321.83 |
| 5,352,364 | 10/1994 | Kruger et al. | 210/321.75 |

OTHER PUBLICATIONS

"Spiral Membrane Ultrafiltration Cartridges"; Amicon, Inc.; Technical Data Sheet; copyright date 1992; pp. 1–8.

*Primary Examiner*—Robert A. Dawson
*Assistant Examiner*—W. L. Walker
*Attorney, Agent, or Firm*—Nicholas P. Triano, III; William L. Baker

[57] ABSTRACT

A spiral-wound filtration cartridge, which renders the need for brine seals unnecessary, is disclosed. The spiral cartridges of the invention comprise a spirally-wound inner filtration assembly having an impermeable outer cylindrical surface, a housing having a cylindrical cavity formed therein for receiving the inner filtration assembly, and at least one continuous longitudinally-oriented fluid pathway disposed between the inner filtration assembly and the housing, the fluid pathway allowing for a portion of a fluid entering one end of the filtration cartridge to bypass the inner filtration assembly and proceed to the other end of the filtration cartridge.

8 Claims, 4 Drawing Sheets

SPIRAL-WOUND FILTRATION CARTRIDGE WITH LONGITUDINAL BYPASS FEATURE

FIELD OF THE INVENTION

This invention relates to spiral-wound filtration cartridges having a design which eliminates the need for brine seals.

Ultrafiltration ("UF"), microfiltration ("MF"), reverse osmosis ("RO") and gas separation are chemical processing operations that are useful for a large number of applications. The single most important step in achieving sustained practical filtration rates for these chemical processing operations was the development of a family of anisotropic polymeric ultrafiltration and microfiltration membranes of various molecular weight cutoffs (MWCO) having effective pore sizes ranging from non-porous to porous in the micron range. UF and MF membranes exhibit very high flow rates at normal operating pressures, is and good resistance to plugging. The latter phenomenon is believed to be largely assignable to a very thin barrier layer on the upstream side of the membrane which allows the membrane to perform as a surface-type rather than a depth-type filter. Such UF and MF membranes as described herein are commercially available from Amicon, Inc. (Beverly, Mass.).

In order to maintain a continuous flow of liquid at the desired high flow rates using these membranes, a widely accepted technique called "cross-flow" (or tangential-flow) filtration may be used in order to process a large volume of liquid in a short time. (Since cross-flow filtration is useful with all types of filtration membranes, e.g., microfiltration, ultrafiltration and reverse osmosis ("RO") membranes, the word "filtration" will be understood herein to refer to all these membrane types.) Rather than employing "well-stirred batch cells," i.e., cells wherein the solution in the cell to be filtered is constantly stirred by an agitating device riding just above the membrane surface at the bottom of the cell, in cross-flow filtration fluid flows across, or tangential to, the filtration membrane surface. High process flux is thus achieved because only the thin membrane surface acts as the sieving barrier, as opposed to depth filtration, where the whole thickness of the membrane is used. Cross-flow filtration also avoids the well-known problem of "concentration polarization," wherein solute rejected by the filtration membrane accumulates on the membrane surface to form a gel-like film that prevents further filtration.

Spiral-wound filtration cartridges ("spiral cartridges" for short) employ the tangential-flow principle. These cartridges are known in the art and may be exemplified by U.S. Pat. No. 5,114,582, the disclosure of which is incorporated herein by reference. In such cartridges, a "sandwich" of membrane layers (membrane sheet-permeate carrier sheet-membrane sheet) is wrapped spirally around a porous permeate collection tube. The sandwiches are separated by spacers which allow for retentate flow channels. A cartridge may contain several such "sandwiches" depending on its size. The membrane edges are bonded so that the process fluid cannot enter the channel where permeate is collected. The spiral-wound assembly is then inserted into a cylindrical housing, and fixed in place. Process fluid fittings may be then be attached. As process fluid flows is axially down the retentate flow channels, permeate moves spirally inside the membrane sandwich to the central collection tube, then exits through a header assembly. This arrangement provides efficient filtration by cross-tangential flow over a large membrane area. Spiral-wound filtration cartridges are used typically for, e.g., gas separation, reverse osmosis, nanofiltration, ultrafiltration, and microfiltration.

Spiral-wound filtration cartridges that are designed to be reusable generally comprise an inner spiral-wound assembly inserted into a cylindrical reusable outer housing. Because such cartridges are not integrally constructed, there is therefore always some space between the inner spiral-wound assembly and the cylindrical outer housing; see, for example, U.S. Pat. No. 5,192,437. Fluid therefore inevitably gets into the "bypass" space between the housing and the assembly; this can result in difficulty in cleaning the cartridge, leading to bacterial growth in that space. Brine seals of differing design, e.g., Zimmerly's U.S. Pat. No. 4,064,052, have been suggested to alleviate this problem; these designs operate on the principle of allowing a controlled flow of fluid to bypass the spiral-wound assembly and thus prevent stagnancy of the fluid in the space between the housing and the cartridge.

The available reusable spiral-wound filtration cartridges of the above designs are plagued with problems. First, designs using brine seals does not provide a satisfactory solution to the problem of bacterial growth, due to the low bypass fluid velocity provided by the designs that have been made available. Secondly, the reusable outer housing is designed to allow removal of the spent or fouled inner spiral-wound assembly, and insertion of a fresh one. In point of fact the job is not as easy or as simple as it should be, since insertion and removal of the inner spiral-wound assembly is made difficult by the tight tolerances required by current designs to ensure good fit of the inner spiral-wound assembly and of the brine seals against the outer housing. Furthermore, the same tight tolerances and present manufacturing methods make reproducible production of such spiral-wound filtration cartridges difficult at best. A third problem endemic to currently available spiral-wound filtration cartridges is that oftentimes a damaging pressure differential exists between the interior and exterior (i.e., bypass flow) retentate flow path of the spiral element; also, conventional single brine seals result in a single pressure drop at one end of the spiral-wound filtration cartridge. The former condition results in stress and/or deformation, and failure of the spiral assembly, while the latter condition can lead to catastrophic failure of the seal through failure of a sealing edge.

SUMMARY OF THE INVENTION

The present invention relates to an autoclavable filtration cartridge comprising a) a spirally-wound inner filtration assembly having an impermeable outer cylindrical surface; b) a housing having a cylindrical cavity formed therein for receiving the inner filtration assembly, the cylindrical cavity forming an inner cylindrical surface; and c) at least one continuous longitudinally-oriented fluid pathway disposed between the inner filtration assembly and the housing, the fluid pathway allowing for a portion of a fluid entering one end of the filtration cartridge to bypass the spirally-wound inner filtration assembly and proceed to the other end of the filtration cartridge.

DESCRIPTION OF THE INVENTION

Figure 1:
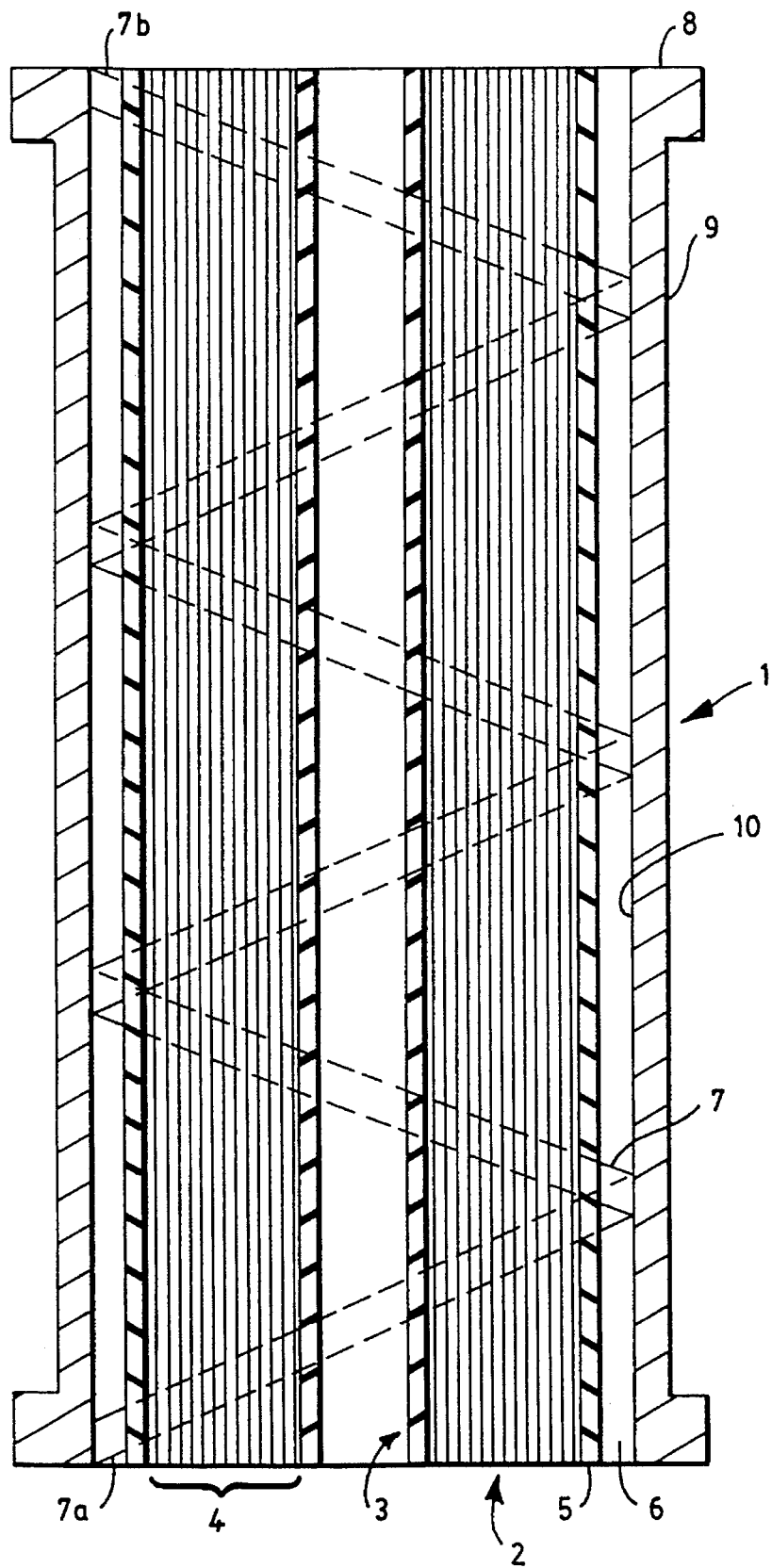
FIG. 1 depicts one embodiment of the spiral cartridge of the invention in longitudinal cross-section.

Turning now to the drawings, FIG. 1 depicts a preferred embodiment of the invention in longitudinal cross-section. Spiral cartridge 1 comprises housing 9, which is generally cylindrically shaped, and encases the spiral assembly 2. Housing 9 further comprises flange 8, over which may be attached fitting(s) of known type allowing the cartridge to be connected to an apparatus for filtering a process fluid. The housing 9 also has formed inside it a cylindrical cavity, for receiving spiral assembly 2, having an inner surface 10. The housing may be made of any material(s) customarily used in making spiral cartridges, e.g., stainless steel; polysulfones; polypropylenes and related compounds; polytetrafluoroethylene (PFTE) and related compounds; or polyvinylchloride. Whatever housing material is used, it must be able to withstand the normal operating conditions such cartridges are subjected to. For light weight and disposability of the spiral cartridges, plastic materials have been found to be preferred when operating conditions allow. Obviously, when higher operating pressures are contemplated, a stiffer material, e.g., 316 stainless steel, will be necessary. Even more preferred are thermoplastic materials, which are easy to make housings from, e.g., by injection molding. Examples of thermoplastics are acrylonitrile-butadiene-styrene resins, acetals, acrylics, cellulosics, chlorinated polyethers, fluorocarbons, nylons(polyamides), polycarbonates, polyolefins and copolymers thereof including but not limited to polyethylenes and copolymers thereof, polypropylenes and copolymers thereof, chlorinated or fluorinated polyolefins and copolymers thereof; polystyrenes, and vinyls, e.g., polyvinyl chloride. Preferred among the thermoplastics are polysulfones.

Figure 2:
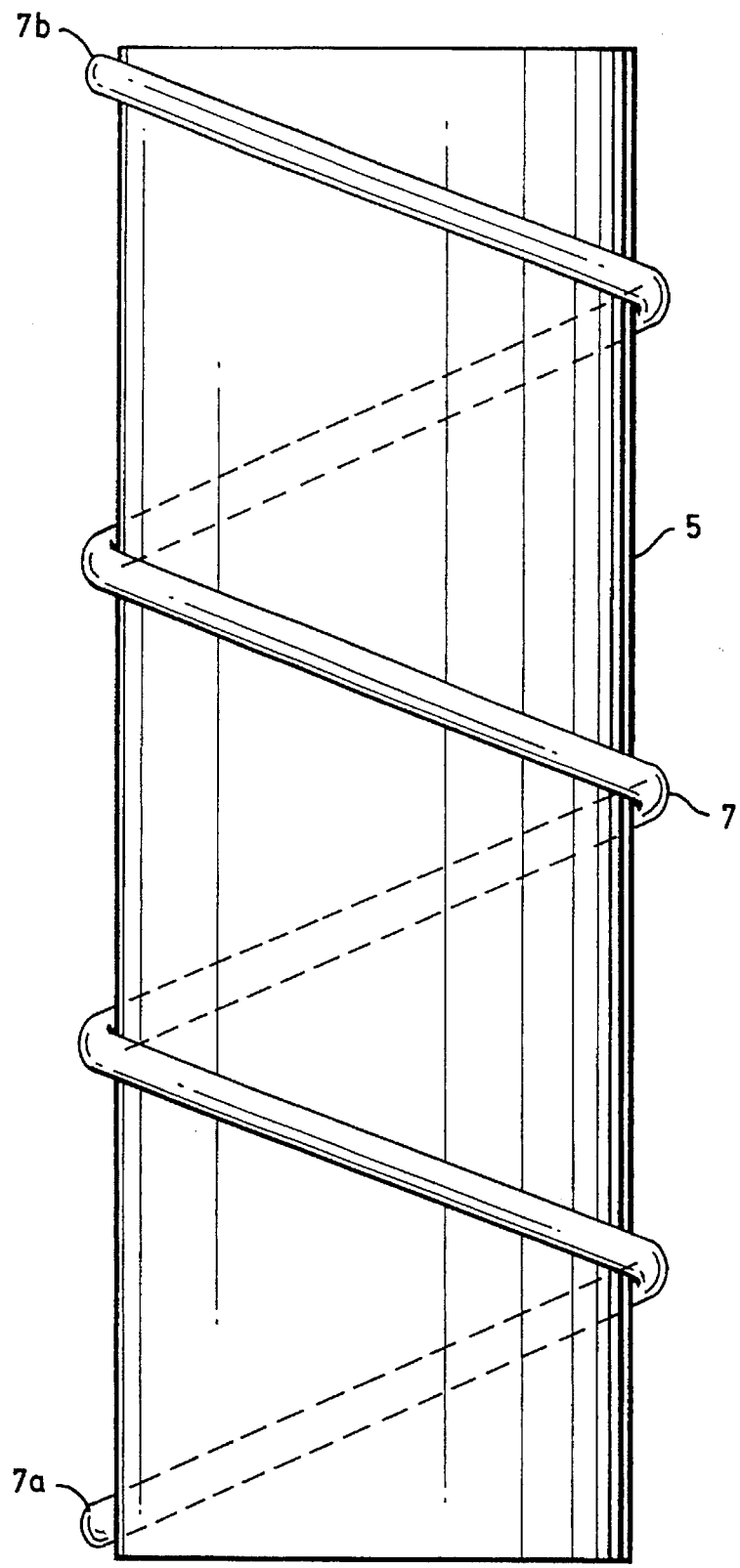
FIG. 2 depicts the inner spiral-wound assembly of FIG. 1 in side view.

The spiral assembly 2 comprises the layers of membrane "sandwiches" indicated in cross-section at 4 that are spirally wrapped around permeate collection tube 3. One of ordinary skill in the art will know how to make spiral as assemblies that may be used in the invention; further reference in this regard may be made to U.S. Pat. No. 5,114,582, mentioned earlier. As shown in the embodiment of FIG. 1, an outer layer 5, formed on the outermost surface of the spiral assembly, is shown having an integral helical ridge 7 beginning at point 7a and terminating at point 7b. A side view of the helical ridge-fitted spiral assembly 2 is shown in FIG. 2.

The outermost surface of the spiral assembly must be substantially impermeable to process fluid passing through the longitudinally-oriented fluid pathway 6 described herein. The helical ridge may be attached to the outermost surface of the spiral assembly, but it is preferred that this be an integral assembly. This integral assembly is advantageously molded onto the spiral assembly; for example, the spiral assembly may be assembled, placed into a mold for forming a polymeric outer layer comprising a helical ridge, then forming the outer layer, by, e.g., injecting a thermoplastic between the mold inner surface and the spiral assembly outer surface. Alternatively, the integral assembly may be molded into a clamshell-type enclosure and glued or otherwise affixed to the spiral assembly. Molding of the outermost surface of the spiral assembly will provide superior dimensional accuracy compared with traditional manufacturing methods applied in the current art of making spiral filtration cartridges; thus the gap between the spiral assembly and the housing may be reduced, and yet ensure a consistent and much higher cleaning velocity (i.e., about 100× greater than brine seal-equipped spiral cartridges) between the housing and the spiral assembly. Those of ordinary skill in the art will deduce alternate methods of manufacture.

The material for making the integral assembly is advantageously a pliant composition, because when the spiral cartridge is made, the spiral assembly is typically inserted into an end of the housing and some compression of the integral assembly is to be expected. Also, this assembly technique will ensure continuous contact between the housing and the spiral assembly. Thermosetting is compositions may advantageously be used in the invention. Examples of suitable thermosets are epoxies; modified epoxies; EPDM copolymers; silicone rubbers such as RTV silicones; fluorosilicone rubbers; nitrile rubbers; butyl rubbers; urethanes such as polyurethane; and mixtures thereof. In the selection of a suitable composition, one needs only to consider whether the composition can 1) withstand the pressures the cartridge will be subjected to under normal operating conditions; and 2) be compatible with the fluids that will pass through the cartridge, as the composition will come in limited contact with those fluids.

One can see from FIG. 1 that a continuous, longitudinally-oriented fluid pathway 6 allows for a portion of process fluid to by pass the spiral assembly 2. The continuous, controlled movement of process fluid through pathway 6 ensures that no bacterial growth will occur and foul the system. Preferably the longitudinally-oriented fluid pathway is configured to allow a bypass flow effective to ensure cleaning of the bypass area according to generally accepted industry standards, or generally about 2.5 ft/s or higher. Helical ridge 7 should substantially be in contact with inner surface 10 of housing 9 so as to provide the continuous pathway. Short-circuiting of the pathway caused by discontinuous contact is not preferred, but in particular situations some short-circuiting may be acceptable.

In the embodiment shown in FIG. 1, the longitudinally-oriented bypass fluid pathway 6 is shown as a single helical pathway defined by the contact of helical ridge 7 and inner cylindrical surface 10. The helical orientation of the bypass fluid pathway is advantageous for several reasons. The helical channel creates a high fluid velocity between the spiral assembly and the housing, ensuring efficient cleaning at a very low parasitic flow rate due to the extended length of the flow channel resulting from the helical path. Further, the helical channel will ensure that no damaging pressure differential will exist between the interior and exterior retentate flow path of the spiral element. The design results in a continuous and even pressure drop along the length of the cartridge. In contrast, conventional single brine seals result in a single pressure drop at one end of the module. It is far better to maintain a gradual pressure differential that more closely matches the actual pressure profile inside the cartridge (as in my invention), to reduce stress and/or deformation of the spiral assembly by a balanced pressure between the inside and outside retentate path of the cartridge. Moreover, this design greatly reduces the criticality of a single seal, since failure of a sealing edge can be quite catastrophic in a single seal.

The helical ridge 7 will conform to an irregular housing or dimensional is variance in size resulting from thermal expansion/contraction by selection of the proper material. A ridge having a triangular shape will conform even more readily to irregularities, e.g., in the inner cylindrical surface, and at the same time reduce frictional resistance for insertion and removal of the spiral assembly. More elegant designs, incorporating self-sealing profiles that will seal as a results of the differential pressure over the ridge, may be desirable.

Figure 3:
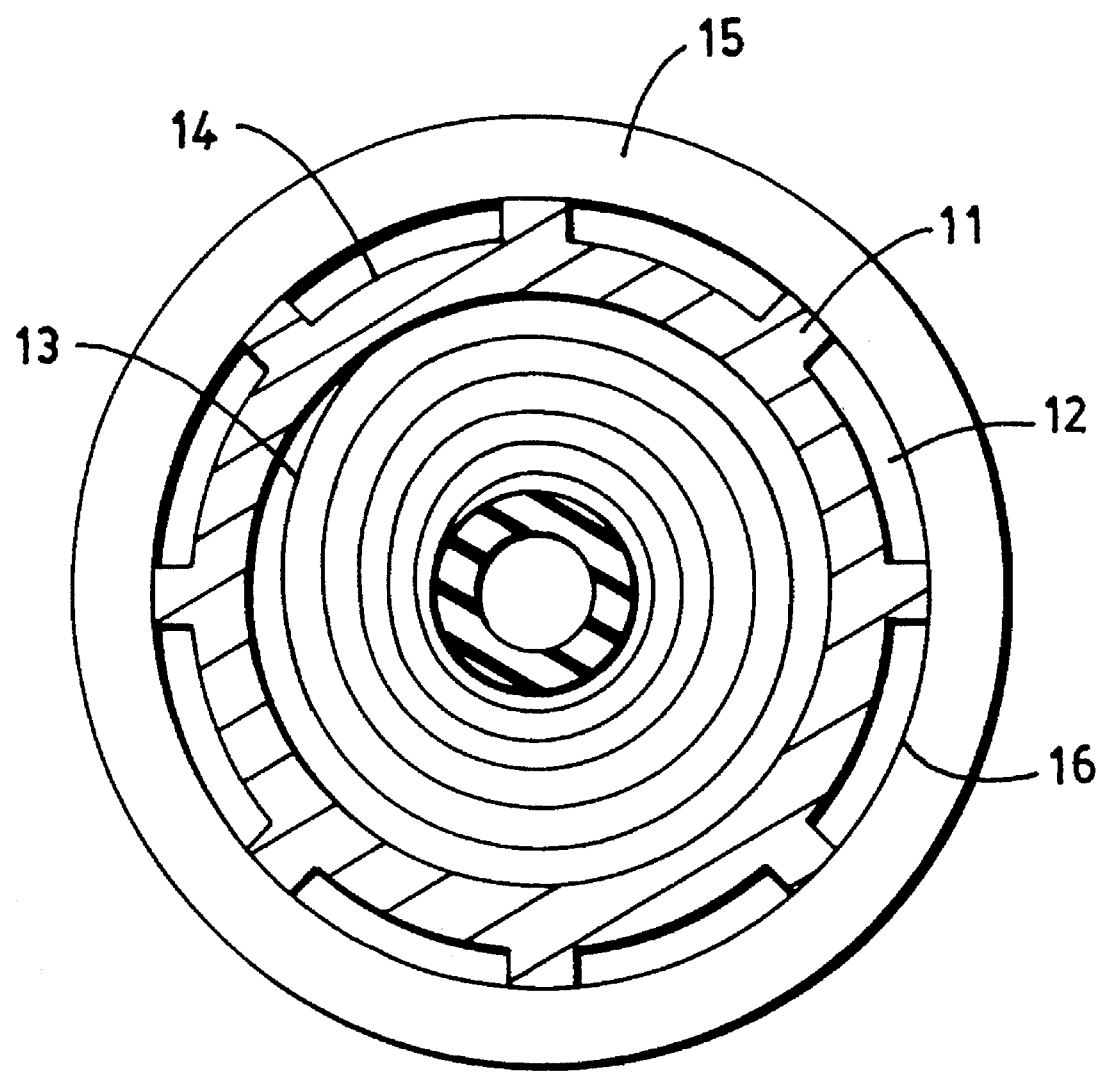
FIG. 3 depicts an alternative embodiment to the spiral cartridge of FIG. 1 in cross-section.
Figure 4:
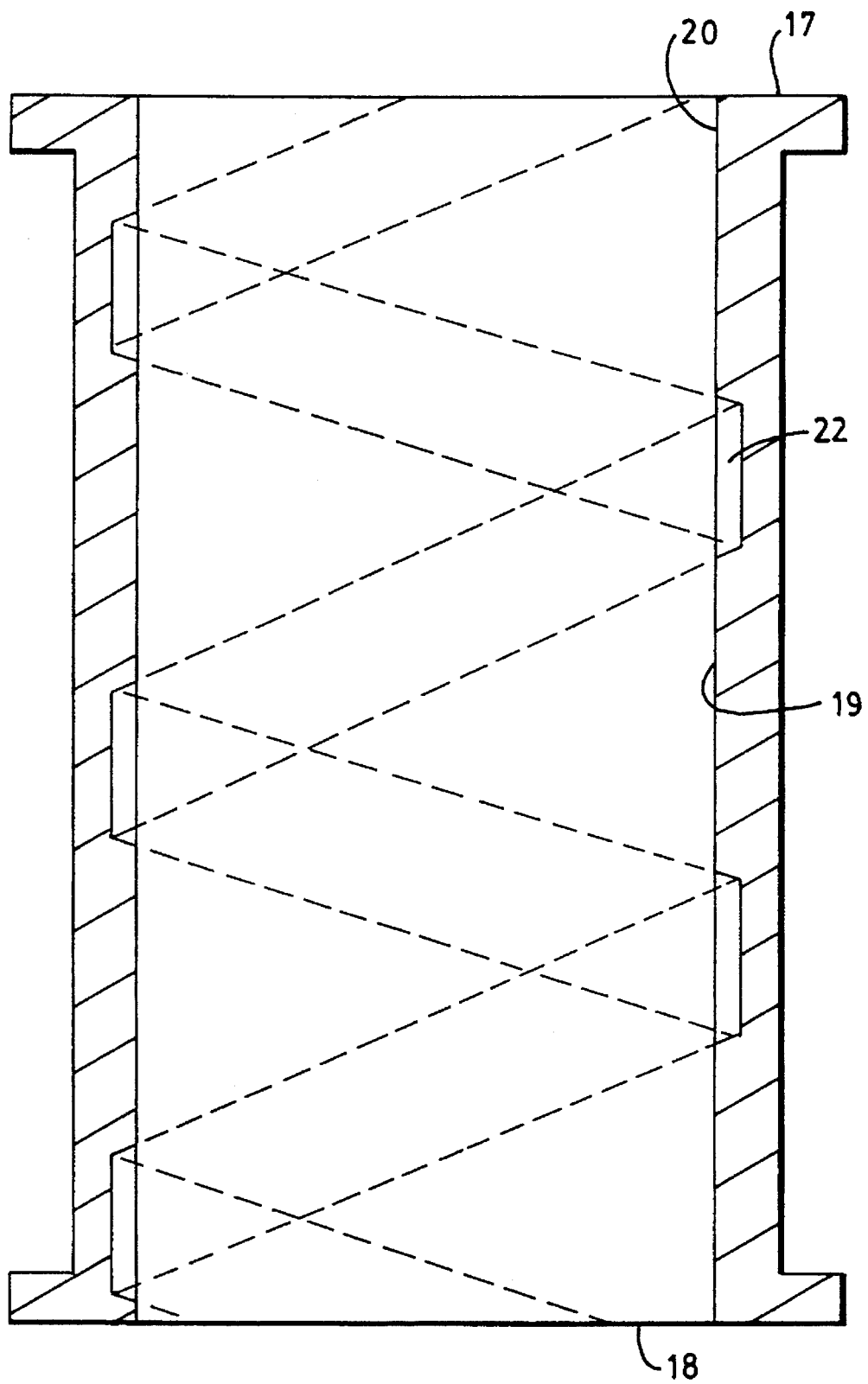
FIG. 4 depicts an alternative embodiment to the spiral cartridge of FIG. 1 in simplified cross-section.

Different embodiments of the invention are intended, however, and some alternatives are shown in FIGS. 3–4. FIG. 3 shows a spiral cartridge in accordance with the invention wherein impermeable outer surface 14 is shown surrounding spiral assembly 13. A plurality of longitudinally-oriented bypass fluid pathways 12 are formed by contact of ridges 11 (integrally formed in, and running axially along integral impermeable outer surface 14) with inner cylindrical surface 16 of housing 15. In FIG. 4, a spiral cartridge similar in concept but different in execution than the spiral cartridge of FIG. 1 is depicted in simplified cross-section; the spiral cartridge assembly 18, covered with a smooth-faced impermeable cylindrical covering, resides within the inner cylindrical surface 20 of housing 17. The helical bypass fluid pathway 22 is formed by providing an integral helical ridge 19 in the cylindrical inner surface 20 of housing 17.

What is claimed is:

1. A spiral filtration cartridge comprising
   a) a spirally-wound inner filtration assembly having an impermeable outer cylindrical surface and a ridge integrally formed in said outer impermeable cylindrical surface;
   b) a housing having a cylindrical cavity formed therein for receiving said inner filtration assembly, said cylindrical cavity having an inner cylindrical surface;
   c) a cavity between said inner and outer surfaces; and
   d) at least one continuous longitudinally-oriented fluid pathway disposed between said spirally-wound inner filtration assembly and said housing, said fluid pathway allowing for a portion of a fluid entering one end of said filtration cartridge to bypass said spirally-wound inner filtration assembly and proceed to the other end of said filtration cartridge, and wherein said ridge is in intimate contact with said inner cylindrical surface, thereby providing said continuous longitudinally-oriented fluid pathway.

2. The filtration cartridge of claim 1 wherein said housing is made of a material selected from the group consisting of stainless steel; polysulfones; polypropylene; polytetrafluoroethylene (PFTE); polyvinylchloride; acrylonitrile-butadiene-styrene resins; acetals; acrylics; cellulosics; chlorinated polyethers; fluorocarbons; nylons(polyamides); polycarbonates; polyolefins and copolymers thereof; polystyrenes; and vinyls.

3. The filtration cartridge of claim 1 wherein said impermeable outer cylindrical surface is made of a material selected from the group consisting of epoxies; modified epoxies; EPDM copolymers; silicone rubbers; fluorosilicone rubbers; nitrile rubbers; butyl rubbers; urethanes; and mixtures thereof.

4. The filtration cartridge of claim 1 wherein said continuous longitudinally-oriented fluid pathway is helical.

5. The filtration cartridge of claim 1 comprising a plurality of said continuous longitudinally-oriented fluid pathways.

6. A spiral filtration cartridge comprising
   a) a spirally-wound inner filtration assembly having an impermeable outer cylindrical surface;
   b) a housing having a cylindrical cavity formed therein for receiving said inner filtration assembly, said cylindrical cavity having an inner cylindrical surface; and
   c) at least one continuous longitudinally-oriented fluid pathway disposed between said spirally-wound inner filtration assembly and said housing, said fluid pathway allowing for a portion of a fluid entering one end of said filtration cartridge to bypass said spirally-wound inner filtration assembly and proceed to the other end of said filtration cartridge, and wherein said continuous longitudinally-oriented fluid pathway is formed in said inner cylindrical surface, thereby providing said continuous longitudinally-oriented fluid pathway.

7. The filtration cartridge of claim 6 wherein said continuous longitudinally-oriented fluid pathway is helical.

8. The filtration cartridge of claim 6 comprising a plurality of said continuous longitudinally-oriented fluid pathways.

* * * * *